(12) United States Patent
Kim

(10) Patent No.: US 7,504,778 B2
(45) Date of Patent: Mar. 17, 2009

(54) EXTERNAL ELECTRODE FLUORESCENT LAMP AND BACKLIGHT UNIT OF LIQUID CRYSTAL DISPLAY DEVICE

(76) Inventor: Jae Bum Kim, #106-1006, Chilgok Hwaseong 3-cha, Dongcheon-dong, Buk-gu, Daegu (KR)

( * ) Notice: Subject to any disclaimer, the term of this patent is extended or adjusted under 35 U.S.C. 154(b) by 0 days.

(21) Appl. No.: 11/639,230

(22) Filed: Dec. 15, 2006

(65) Prior Publication Data

US 2007/0152594 A1 Jul. 5, 2007

(30) Foreign Application Priority Data

Dec. 30, 2005 (KR) .................. 10-2005-0135025

(51) Int. Cl.
*H01J 65/00* (2006.01)
*H01J 61/06* (2006.01)
*H01J 11/00* (2006.01)

(52) U.S. Cl. ............... 313/607; 313/484; 313/485; 313/487; 313/492; 313/493

(58) Field of Classification Search ........... 313/507, 313/594, 318.01–318.12, 484–493, 623; 345/47

See application file for complete search history.

(56) References Cited

U.S. PATENT DOCUMENTS

| | | | | |
|---|---|---|---|---|
| 5,563,474 A * | 10/1996 | Wessels et al. | ............. | 315/248 |
| 6,465,955 B1 * | 10/2002 | Kraus et al. | ............. | 313/567 |
| 7,265,500 B2 * | 9/2007 | Ono et al. | ............. | 315/291 |
| 2004/0008524 A1 * | 1/2004 | Lee et al. | ............. | 362/561 |
| 2006/0076893 A1 * | 4/2006 | Murakami et al. | ............. | 313/607 |

* cited by examiner

*Primary Examiner*—Joseph L Williams
*Assistant Examiner*—Elmito Breval
(74) *Attorney, Agent, or Firm*—Holland & Knight LLP

(57) ABSTRACT

An external electrode fluorescent lamp includes a ferroelectric glass tube filled with discharge gas, and a ferroelectric film on an internal surface of the ferroelectric glass tube.

16 Claims, 9 Drawing Sheets

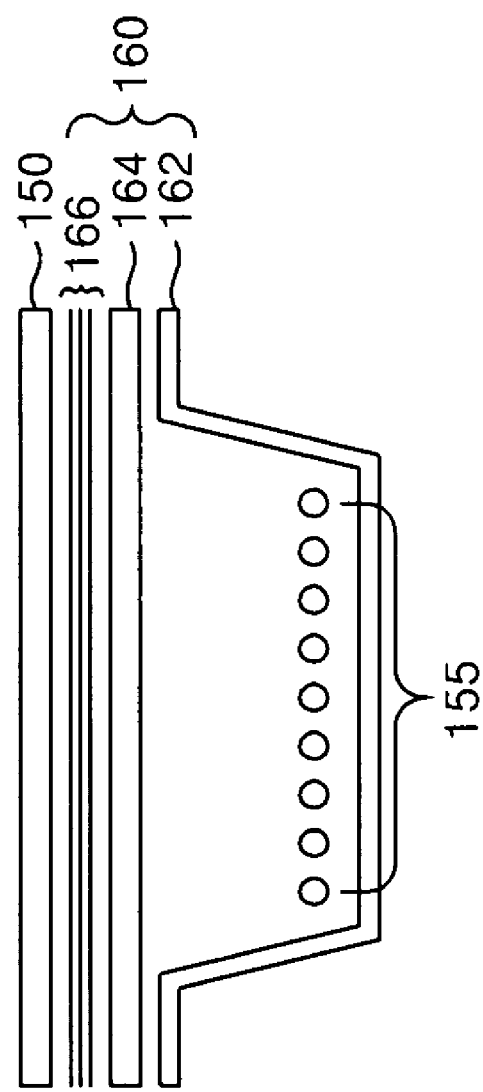

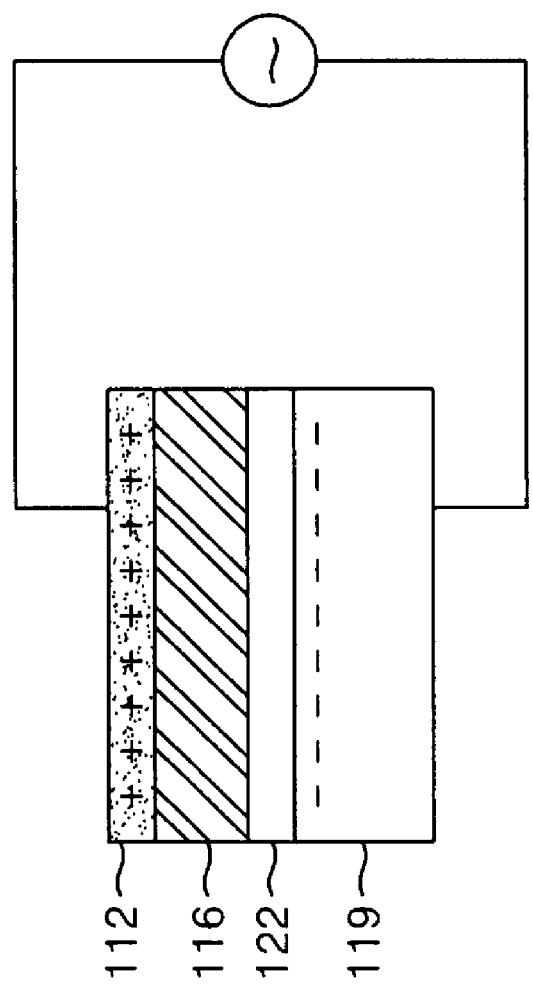

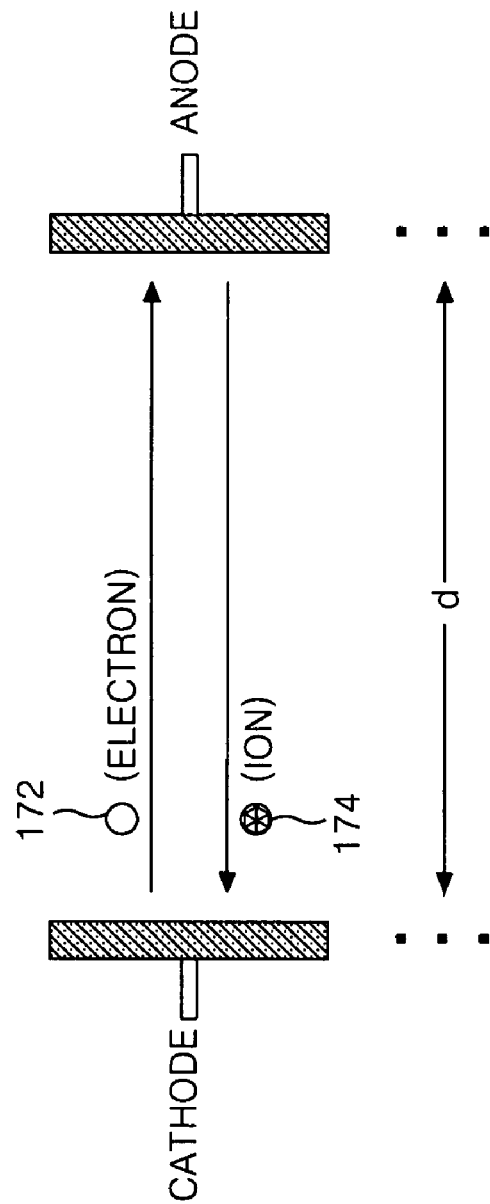

EXTERNAL ELECTRODE FLUORESCENT LAMP AND BACKLIGHT UNIT OF LIQUID CRYSTAL DISPLAY DEVICE

This application claims the benefit of the Korean Patent Application P05-0135025 filed on Dec. 30, 2005 which is hereby incorporated by reference in its entirety.

BACKGROUND OF THE INVENTION

1. Field of the Invention

Embodiments of the invention relate to a liquid crystal display device, and more particularly to an external electrode fluorescent lamp and a backlight unit of a liquid crystal display device using the same. Although embodiments of the invention are suitable for a wide scope of applications, it is particularly suitable for improving light efficiency and reducing power consumption of an external electrode fluorescent lamp.

2. Description of the Related Art

In general, the applications for a liquid crystal display (LCD) device are broadening due to its characteristics of lightweight, thin profile, and low power consumption. For example, the liquid crystal display device is now used in office automation equipment and audio/video equipment. The liquid crystal display device controls light transmission in accordance with signals applied through a plurality of control switches, which are arranged in a matrix shape, to thereby display a desired picture on a screen. The liquid crystal display device is not a self luminous display device. A separate light device, such as a backlight, provides the light to the liquid crystal display device.

The backlight is classified as either a direct type or an edge type depending on the location of a light source relative to the liquid crystal display panel. The edge type backlight has a light source installed along an edge of a liquid crystal display device, and irradiates light onto a liquid crystal display panel through a light guide panel and a plurality of optical sheets. The direct type backlight has a plurality of light sources disposed directly under the liquid crystal display device, and irradiates light onto the liquid crystal display panel through a diffusion plate and a plurality of optical sheets.

The direct type backlight has higher brightness, more consistent light uniformity and higher color purity are higher than the edge type backlight. Thus, the direct type backlight is more often used in display devices, such as an LCD television. However, an edge type is used where a thin profile is desired, such as a laptop computer display.

FIG. 1 is a diagram representing a cold cathode fluorescent lamp of the related art. Cold cathode fluorescent lamps (CCFL) have been typically the fluorescent lamps used as light sources in the direct type backlight unit. As shown in FIG. 1, the cold cathode fluorescent lamp CCFL includes a glass tube 6, internal electrodes 2 inside of both ends of the glass tube 6, lead electrodes 4 that are in contact with the internal electrodes 2 and extend to the outside of the ends of the glass tube 6, and a fluorescent material 10 on the internal surface of the glass tube 6 at a central portion of the glass tube 6 for radiating visual light. An inner space 9 of the glass tube 6 is filled with mercury (Hg) and a discharge gas made of argon (Ar) and neon (Ne). The cold cathode fluorescent lamp CCFL uses internal electrodes that are connected to an outside wire assembly, which provides the electrical energy to generate light emission.

FIG. 2 is a diagram representing an external electrode fluorescent lamp of the related art. Instead of internal electrodes, the external electrode fluorescent lamp uses external electrodes on the external surface at both ends of the glass tube, as shown in FIG. 2. The external electrode fluorescent lamp (EEFL) 2 includes a glass tube 16, external electrodes 12 are formed on the external surface of the glass tube 16 at both ends of the glass tube 16, and a fluorescent material 20 is formed on the internal surface of the glass tube 16 at a central portion of the glass tube 16 for radiating visual light. An inner space 19 of the glass tube 16 is filled with mercury (Hg) and a discharge gas made of argon (Ar) and neon (Ne).

In the external electrode fluorescent lamp EEFL, the mercury (Hg) and the discharge gas are injected into the glass tube 16 and then the external electrodes 12 are disposed on the external surface of the glass tube 16 at both ends of the glass tube 16. If a voltage is applied between the external electrodes 12, a discharge of ultraviolet light is generated that causes the fluorescent material 20 to emit visible light. Aluminum tape (AL tape) or aluminum paste (AL paste) can be used as an external electrode 12 material of the external electrode fluorescent lamp EEFL. The internal pressure of the argon (Ar) and neon (Ne) within the glass tube 16 is not less than 50 torr and argon (Ar) is about 10% of the argon (Ar) and neon (Ne) discharge gas. However, a high voltage for discharge is required because the pressure within the tube in the related art external electrode fluorescent lamp EEFL is at a high pressure of not less than 50 torr. Thus, power consumption is increased and lighting efficiency is reduced.

SUMMARY OF THE INVENTION

Accordingly, embodiments of the invention is directed to an external electrode fluorescent lamp and a backlight unit of a liquid crystal display device that substantially obviate one or more of the problems due to limitations and disadvantages of the related art.

Accordingly, it is an object of embodiments of the invention is to provide an external electrode fluorescent lamp having improved light efficiency and reduced power consumption.

It is another object of embodiments of the invention is to provide a backlight unit having improved light efficiency and reduced power consumption.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an external electrode fluorescent lamp includes a ferroelectric glass tube filled with discharge gas, and a ferroelectric film on an internal surface of the ferroelectric glass tube.

In another aspect, an external electrode fluorescent lamp includes a ferroelectric glass tube filled with discharge gas, ferroelectric films on an internal surface of the ferroelectric glass tube and respectively positioned at ends of the ferroelectric glass tube, and external electrodes on an external surface of the ferroelectric glass tube overlapping the ferroelectric films.

In yet another aspect, a backlight unit of a liquid crystal display device includes a plurality of external electrode fluorescent lamps that generate light supplied to a liquid crystal display panel, a diffusion plate that disperses light generated from the external electrode fluorescent lamps, and optical sheets located between the diffusion plate and the liquid crystal display panel to redirect the dispersed light toward the liquid crystal display panel, wherein the external electrode fluorescent lamp includes a ferroelectric glass tube filled with discharge gas and a ferroelectric film on an internal surface of the ferroelectric glass tube.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

In The Drawings:

FIG. 5 is a diagram representing a backlight unit of a liquid crystal display device according to an embodiment of the invention;

FIGS. 6A and 6B are diagrams respectively showing the amount of electric charges for the case of a typical glass tube and the case of a ferroelectric glass tube with ferroelectric films;

FIG. 8 is a diagram for explaining Paschen's law.

DETAILED DESCRIPTION OF THE PREFERRED EMBODIMENTS

Figure 1:
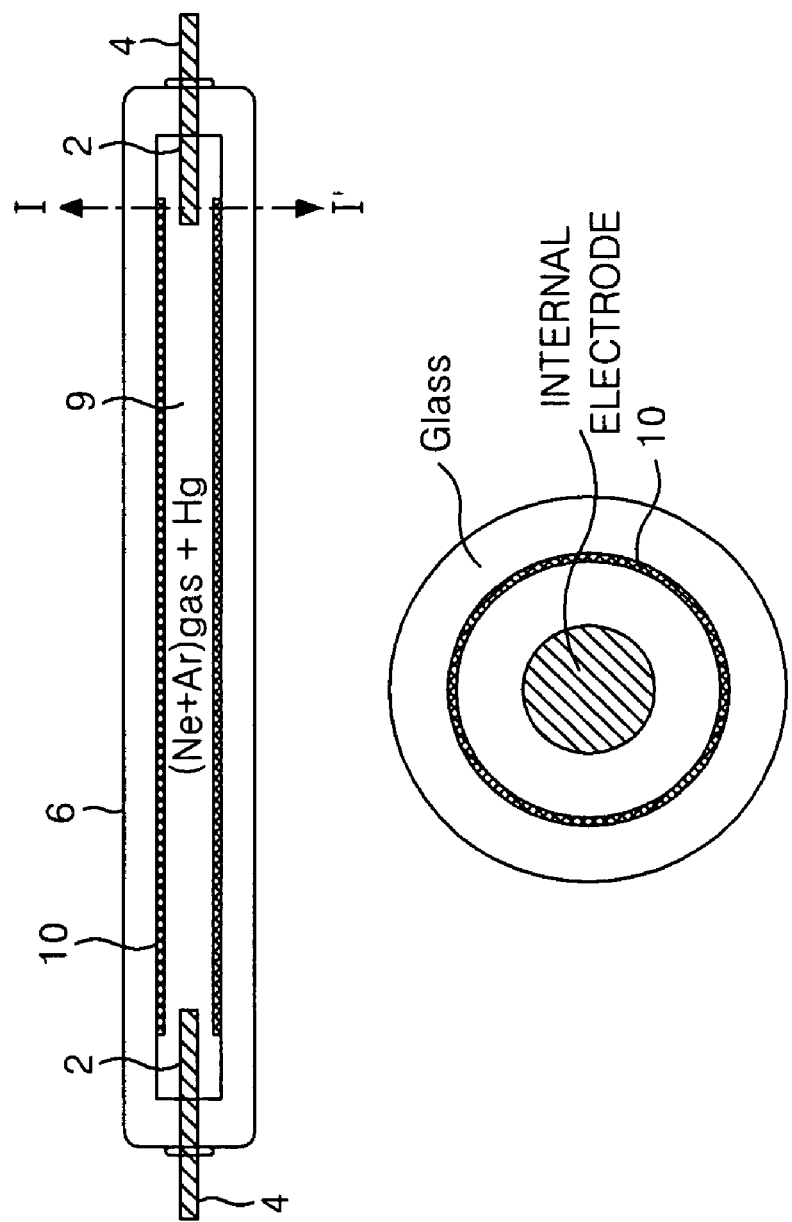
FIG. 1 is a diagram representing a cold cathode fluorescent lamp of the related art.
Figure 2:
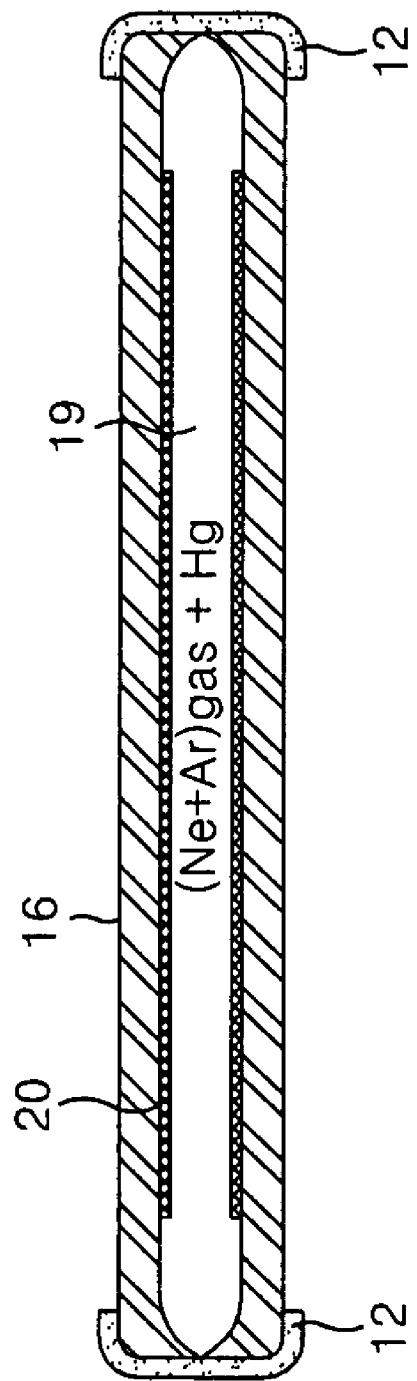
FIG. 2 is a diagram representing an external electrode fluorescent lamp of the related art.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 3:
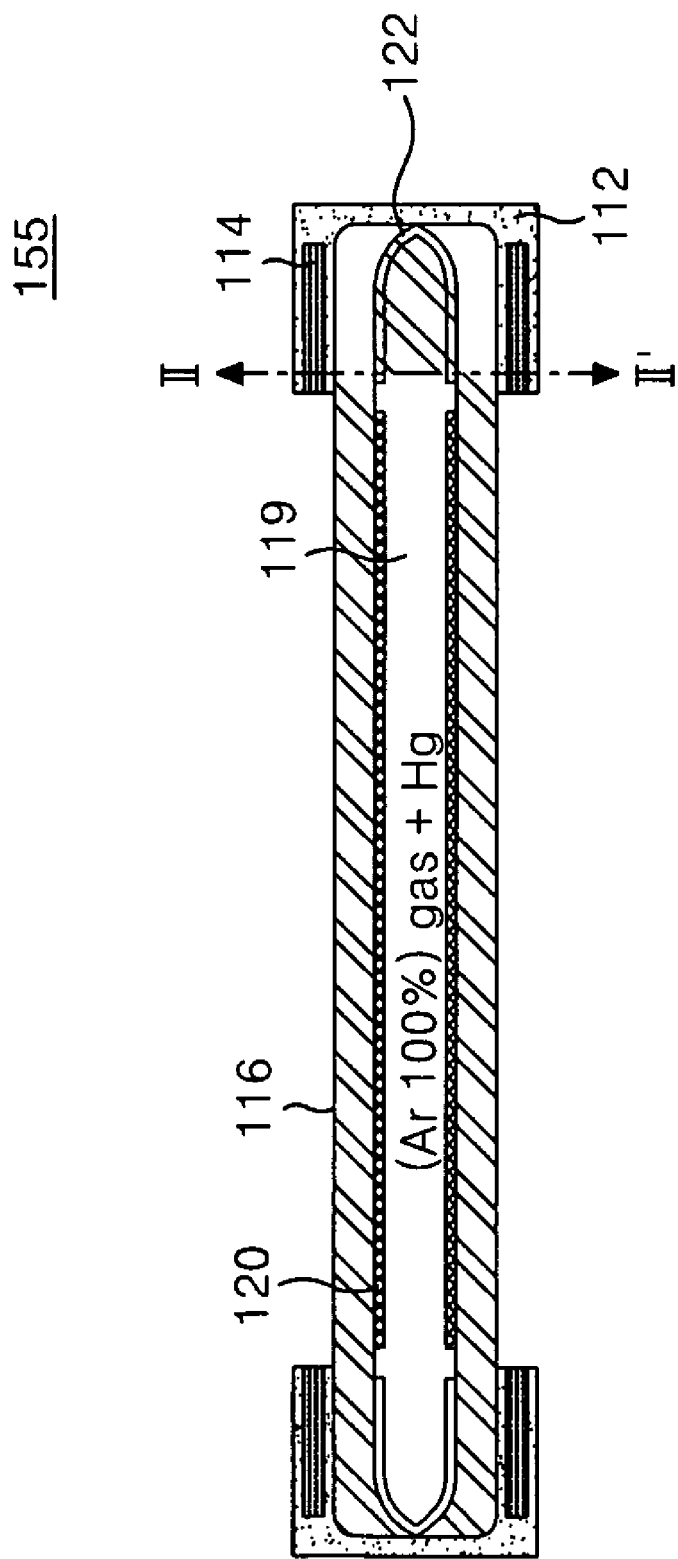
FIG. 3 is a diagram representing an external electrode fluorescent lamp according to an embodiment of the invention.
Figure 4:
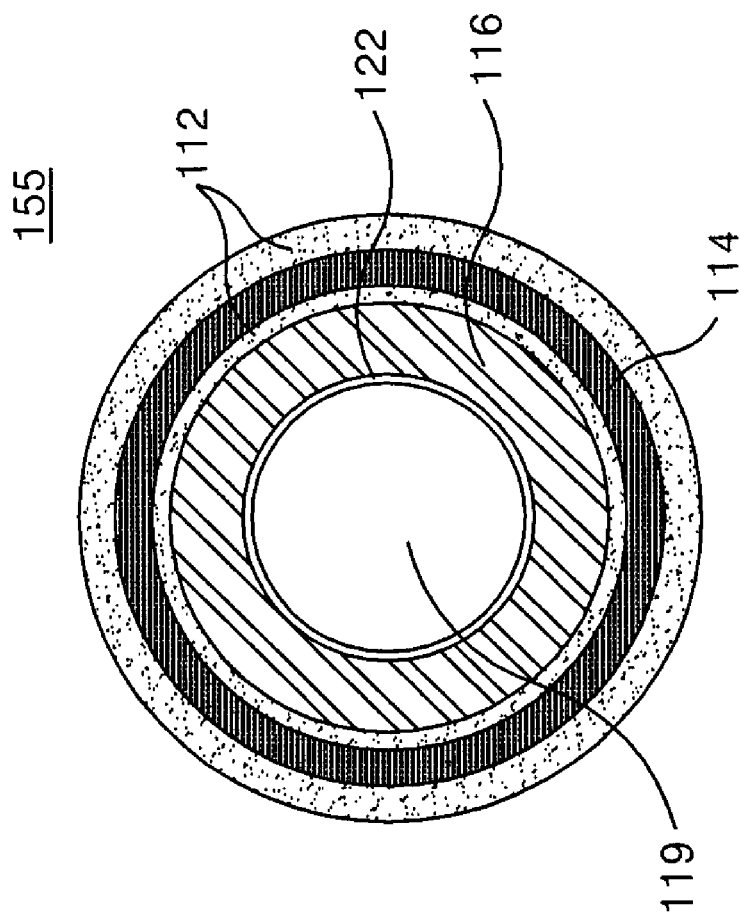
FIG. 4 is a cross-sectional diagram illustrating the external electrode fluorescent lamp, taken along line II-II' of FIG. 3.

FIG. 3 is a diagram representing an external electrode fluorescent lamp according to an embodiment of the invention. FIG. 4 is a cross-sectional diagram illustrating the external electrode fluorescent lamp, taken along line II-II' of FIG. 3. FIG. 5 is a diagram representing a backlight unit of a liquid crystal display device according to an embodiment of the invention. More specifically, FIG. 5 is a diagram representing a backlight unit of a liquid crystal display device that uses the external electrode fluorescent lamps (EEFLs) of FIGS. 3 and 4 as a light source. The liquid crystal display device shown in FIG. 5 includes a liquid crystal display panel 150 for displaying a picture and a backlight unit 160 for irradiating light onto the liquid crystal display panel 150.

A plurality of data lines and a plurality of gate lines are arranged to cross each other to define liquid crystal cells arranged in an active matrix shape between upper and lower substrates on the liquid crystal display panel 150. Further, pixel electrodes and a common electrode for applying electric field to each of the liquid crystal cells are formed in the liquid crystal display panel 150. Thin film transistors (TFTs) are formed where the data lines and the gate lines cross each other. The thin film transistors (TFTs) switch data voltages to the pixel electrode in response to scan signals.

As shown in FIG. 5, the backlight unit 160 includes a plurality of external electrode fluorescent lamps (EEFLs) 155, a bottom cover 162, a diffusion plate 164, and a plurality of optical sheets 166. The bottom cover 162 is shaped such that a plurality of external electrode fluorescent lamps (EEFLs) 155 are housed in an inner space and reflection plates are formed at bottom and side surfaces of the inner space. The external electrode fluorescent lamps (EEFLs) 155 emit light in response to a high AC voltage from an inverter (not shown). The diffusion plate 164 is assembled to the bottom cover 162 and disperses light from the external electrode fluorescent lamps (EEFLs) 155. The plurality of optical sheets 166 are positioned to receive the dispersed light and direct the dispersed light toward the liquid crystal display panel 150.

The diffusion plate 164 includes a plurality of beads (not shown). The beads disperse light from the external electrode fluorescent lamp (EEFL) 155 such that there is no brightness difference in the display surface of the liquid crystal display panel 150. The beads are scattered in a medium (not shown) having the same refractive index as the beads so that the dispersed light is not condensed.

The optical sheets 166 include one or more diffusion sheets and one or more prism sheets so as to redirect the dispersed light from the diffusion plate 164 to the whole liquid crystal display panel 150. More specifically, the optical sheets 166 bend the dispersed light in a vertical direction toward the display surface of the liquid crystal display panel 150. Thus, the optical sheets 166 act to condense the dispersed light to emanate from the front surface of the liquid crystal display panel 150.

Referring back to FIGS. 3 and 4, an external electrode fluorescent lamp (EEFL) 155 of an embodiment of the invention includes a ferroelectric glass tube 116 made of glass, cylindrical metal tubes 114 that encompass the ferroelectric glass tube 116 at ends of the ferroelectric glass tube 116, external electrodes 112 that encompass the cylindrical metal tubes 114 at ends of the glass tube 116, a fluorescent material 120 coated on the internal surface of the ferroelectric glass tube 116 at a middle portion of the ferroelectric glass tube 116 for generating visible light, and ferroelectric films 122 coated on the internal surface of the ferroelectric glass tube 116 at ends of the glass tube 116. An inner space 119 of the ferroelectric glass tube 116 is filled with mercury (Hg) and a discharge gas made of argon (Ar).

The ferroelectric glass tube 116 is made from a soda lime group material, such as $Li_2O$, $Na_2O$, $K_2O$, and $BaO$. The soda lime group material of the ferrolelectric glass tube 116 can have a dielectric constant of about 10~20.

The ferroelectric films 122 are located on the internal surface of the glass tube 116 and overlapped by the external electrodes 112 with the ferroelectric glass tube 116 therebetween. Further, the ferroelectric films 122 are not overlapped by the fluorescent material 120, which is located on the internal surface of the glass tube 116 at a central portion of the ferroelectric glass tube 116. The ferroelectric films 122 are formed of a ferroelectric material having a dielectric constant of about 4~20. The ferroelectric films 122 are formed of one of the ferroelectric material shown in the following TABLE 1.

TABLE 1

| Name of Material | Chemical Formula |
| --- | --- |
| Barium Titanate | $BaTi_3$ |
| Lithium Niobate | $LiNbO_3$ |
| Gadolinium Molybdate | $Gd_2(MoO_4)_3$ |
| Antimony Sulphoiodide | SbSI |
| Sodium Nitrite | $NaNO_2$ |
| Potassium Dihydrogen Phosphate | $KH_2PO_4$ |
| Triglycine Sulfate | $(NH_2CH_2COOH)_3H_2SO_4$ |
| Rochelle salt | $NaKC_4H_4O_6 \cdot 4H_2O$ |

By using the above mentioned ferroelectric glass tube 116 and the ferroelectric films 122, the external electrode fluorescent lamps (EEFLs) can generate discharge at a relatively low voltage because the electric charge amount across the ferroelectric glass tube 116 is larger at lower voltages. As a result, the light efficiency is increased and the power consumption is reduced.

Figure 6A:
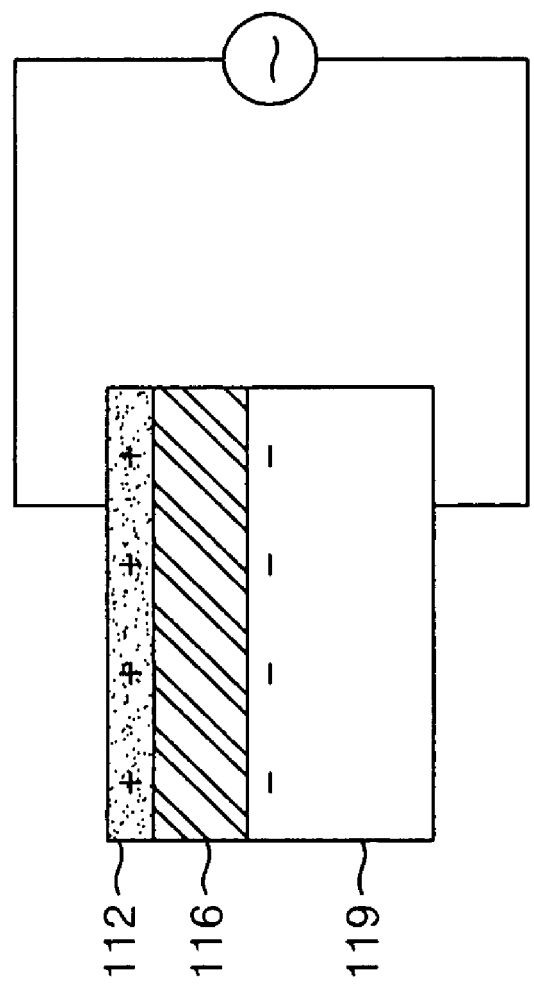

FIGS. 6A and 6B are diagrams respectively showing the amount of electric charges for the case of a typical glass tube and the case of a ferroelectric glass tube with ferroelectric films. The amount of the electric charges in the case of using the ferroelectric glass tube 116 and the ferroelectric film 122 can be determined by the following mathematical formulas.

$$C = \epsilon(A/d) \quad \text{[Mathematical Formula 1]}$$

(C is an electric capacity, $\epsilon$ is a dielectric constant, A is an electrode area, d is a distance between electrodes)

$$Q = CV \quad \text{[Mathematical Formula 2]}$$

The determination of the amount of the electric charges is based upon the electric capacity C being proportional to the dielectric constant $\epsilon$ as shown in Mathematical Formula 1 and the electric capacity C being proportional to the electric charge amount Q as shown in Mathematical Formula 2. In other words, the electric capacity C gets larger as the dielectric constant $\epsilon$ becomes larger, and the electric charge amount Q gets larger as the electric capacity C becomes larger.

The electric capacity C is increased by the ferroelectric glass tube 116 and the ferroelectric films 122 so that the electric charge amount Q is increased. The electric charge amount Q can be increased so that much more electric charges can be accumulated in the ferroelectric glass tube 116 than in the related art glass tube, even though the same discharge voltage V as in the related art is applied across both ends of the fluorescent lamp. The increase in accumulated charge improves light efficiency and reduces power consumption.

The metal tubes 114 are made from a material, such as phosphor or bronze. Each of the metal tubes 114 respectively encompass the ferroelectric glass tube 116 and are respectively positioned at ends of the ferroelectric glass tube 116. If a high voltage is applied across the ends of the external electrode 112 to generate the discharge, a spark can be generated that impacts and damages the external electrode 112. The metal tube 114 directly contacts the external electrode 112 and is positioned so as to prevent damage to the external electrode 112 due to a spark, which can be generated by the high voltage supplied to the external electrode 112, that renders the external electrode fluorescent lamp inoperable. More particularly, the metal tube 114 enables operation of the external electrode fluorescent lamp after a spark event that otherwise would have made the external electrode fluorescent lamp inoperable.

The external electrode 112 can have a composition as shown in TABLE 2.

TABLE 2

| Tin (Sn) | Bismuth (Bi) | Zinc (Zn) | Indium (In) | Antimony (Sb) | Aluminum (Al) |
| --- | --- | --- | --- | --- | --- |
| 60~70% | 22~28% | 3~6% | 1~2% | 0.2~0.7% | 0.05~0.15% |

Figure 7:
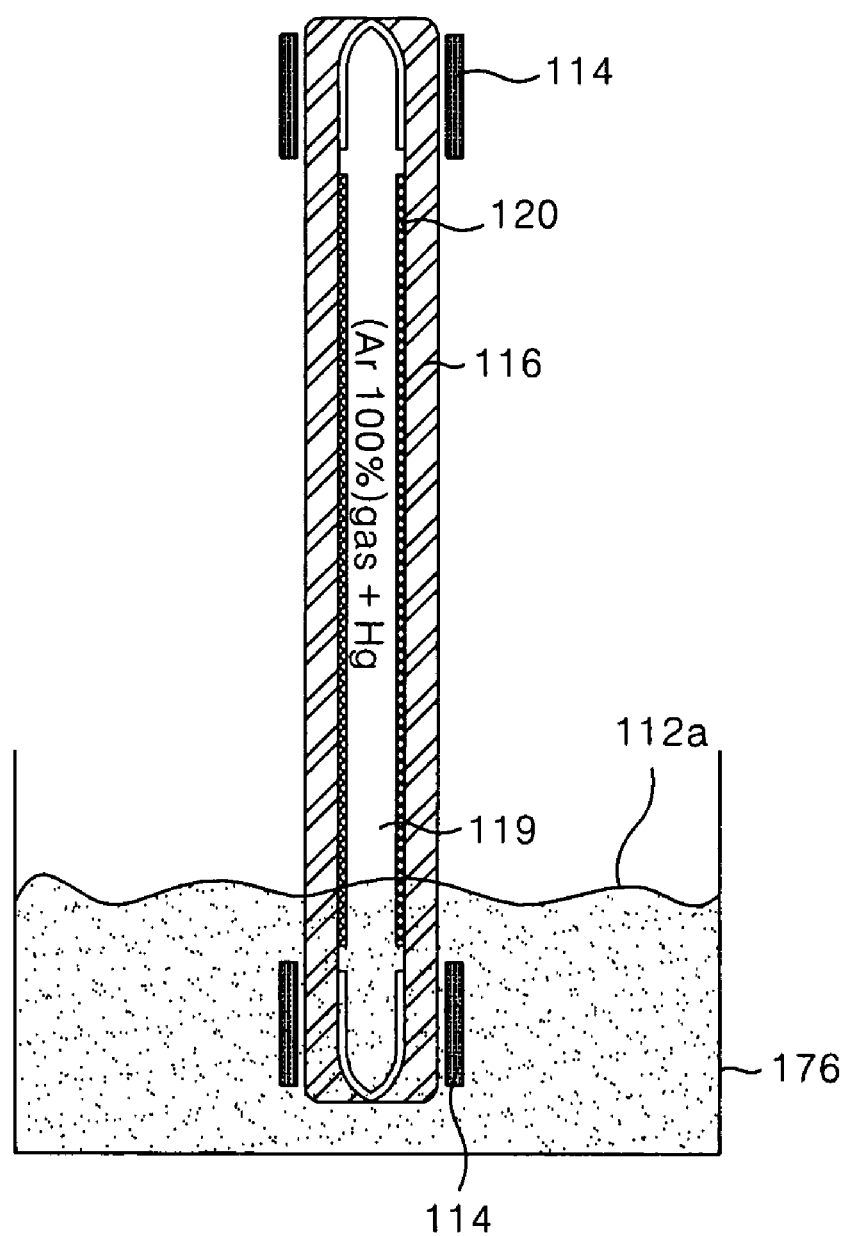
FIG. 7 is a diagram representing a process of forming the external electrode of FIGS. 3 and 4.

For example, the external electrode 112 can be 67.9% Tin (Sn), 25% Bismuth (Bi), 5% Zinc (Zn), 1.5% Indium (In), 0.5% Antimony (Sb) and 0.1% Aluminum. FIG. 7 is a diagram representing a process of forming the external electrode of FIGS. 3 and 4. The external electrode 112 with such a composition can be formed by a dipping method, as shown in FIG. 7. More specifically, ends of a ferroelectric glass tube 116 with metal tubes 114 at both ends are respectively dipped into a container 176 of Pb-free solder 112A having the composition shown in TABLE 2. Then, the Pb-free solder 112A is hardened to form the external electrodes 112, which respectively encompass the metal tubes 114 at the ends of the ferroelectric glass tube 116, as shown in FIGS. 3 and 4. Further, the external electrodes 112 can even be formed in the small gap between the metal tubes 114 and the ferroelectric glass tube 116. The external electrodes 112 formed by such a method can be made of aluminum (Al), which has good adhesive characteristics to the ferroelectric glass tube 116.

The inner space 119 within the ferroelectric glass tube 116 is filled with the mercury (Hg) and the discharge gas. The pressure P within the ferroelectric glass tube 116 is about 5~45 torr, which is lower than the pressure (not less than 50 torr) within the related art glass tube. Further, the discharge gas is composed only of argon (Ar) as compared to the related art discharge gas of argon (Ar) and neon (Ne). Light can be generated more efficiently with a relatively lower-pressured single gas instead of the higher-pressured combination of two gases. In other words, the lower-pressured single-element discharge gas EEFL of embodiments of the present invention can generate more light at a lower discharge voltage than the higher-pressured dual-element discharge gas EEFL of the related art. Embodiments of the invention only use 100% argon (Ar) as the discharge gas, which makes it possible to use a lower pressure in the inner space 119 of the ferroelectric glass tube 116. By Paschen's law, the lower pressure enables light to be generated at a relatively lower voltage.

FIG. 8 is a diagram for explaining Paschen's law. As shown in FIG. 8, if the discharge voltage is applied to the cathode and the anode for generating light, electrons in the cathode collide with the molecules of the discharge gas. As a result, the gas molecule goes into a plasma state in which the gas molecule is divided into an electron and an ion, and the electron 172 moves to the anode and the ion 174 moves to the cathode. The law that represents the relation between a discharge voltage Vf for generating the electron 172 and the ion 174, pressure P of the gas and the distance d between electrodes is Paschen's law.

The Paschen's law shown in relational expression (1) of FIG. 8 can be approximated as relational expression (2). In other words, Paschen's law demonstrates that the discharge voltage Vf is proportional to the pressure of gas P and the distance d between electrodes. Thus, if the distance d between electrodes is fixed and if the pressure P of gas is lowered, then the discharge voltage Vf can be lowered. Accordingly, light can be generated by use of the discharge voltage Vf, which is lower than the related art, thereby light efficiency is improved and power consumption is reduced.

As the density of the gas molecules is decreased as the pressure P is lowered, the sputtering generation rate increases such that the internal surface of the glass tube 116 can be damaged. The ferroelectric film 122 is formed on the internal surface of the ferroelectric glass tube 116 at both ends of the ferroelectric glass tube 116 where the sputtering is concentrated. The ferroelectric film 122 prevents any ferroelectric glass tube 116 damage due to an increase in sputtering at lower pressures.

The external electrode fluorescent lamp EEFL 155 according to embodiments of the invention adopts the ferroelectric glass tube 116 and the ferroelectric films 122 to increase the accumulated amount of electric charge. Accordingly, the light generation rate in comparison with the related art at the same discharge voltage is increased, thereby improving light efficiency and reducing power consumption. Further, argon (Ar) is only used as the discharge gas filled into the inner space 119 of the ferroelectric glass tube 116 and/or the gas pressure of the inner space 119 is maintained to be about 5~45 torr. Even at a lower pressure state than the related art, light can be generated with a relatively lower voltage than the related art having a discharge gas at a higher pressure, thereby improving light efficiency and reducing power consumption.

By using a backlight unit 160 that generates light with an external electrode fluorescent lamp (EEFL) 155 having lower-pressured single-element discharge gas, more light can be supplied to the liquid crystal display panel 150 at the same discharge voltage used in the related art. Thus, it becomes possible to decrease the discharge voltage to supply the same light so as to reduce power consumption.

As described above, the external electrode fluorescent lamp (EEFL) according to embodiments of the invention and the backlight unit of the liquid crystal display device using the same uses a ferroelectric glass tube with ferroelectric films to increase the accumulation amount of electric charge. Accordingly, the discharge generation rate is increased. Further, the discharge gas in the ferroelectric glass tube inner space includes only argon (Ar) at a gas pressure of about 5~45 torr so as to be able to generate light with a low drive voltage. As a result, the efficiency of the light supplied to the liquid crystal display panel is improved and the power for providing the light is reduced.

It will be apparent to those skilled in the art that various modifications and variations can be made in the external electrode fluorescent lamp and backlight unit of liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. An external electrode fluorescent lamp, comprising:
a ferroelectric glass tube filled with discharge gas;
a ferroelectric film on an internal surface of the ferroelectric glass tube; and
external electrodes on an external surface of the ferroelectric glass tube overlapping the ferroelectric films,
wherein the external electrode is made from Tin (Sn) of 60~70% by weight, Bismuth (Bi) of 22~28% by weight, Zinc (Zn) of 3~6% by weight, Indium (In) of 1~2% by weight, Antimony (Sb) of 0.2~0.7% by weight and Aluminum (Al) Of 0.05~0.15% by weight.

2. The external electrode fluorescent lamp according to claim 1, wherein the ferroelectric glass tube has a dielectric constant of about 10~20.

3. The external electrode fluorescent lamp according to claim 1, are respectively positioned at ends of the ferroelectric glass tube.

4. The external electrode fluorescent lamp according to claim 1, wherein the ferroelectric glass tube includes at least one of Li2O, Na2O, K2O and BaO.

5. The external electrode fluorescent lamp according to claim 1, wherein the ferroelectric film has a dielectric constant of about 4~20.

6. The external electrode fluorescent lamp according to claim 5, wherein the ferroelectric film includes at least one of Barium Titanate (BaTiO3), Lithium Niobate (LiNbO3), Gadolinium Molybdate (Gd2(MoO4)3), Antimony Sulphoiodide (SbSI), Sodium Nitrite (NaNO2), Potassium Dihydrogen Phosphate (KH2PO4), Triglycine Sulfate ((NH2CH2COOH)3H2SO4) and Rochelle salt (NaKC4H4O6.4H2O.

7. The external electrode fluorescent lamp according to claim 1, wherein the discharge gas is argon (Ar).

8. The external electrode fluorescent lamp according to claim 1, wherein pressure of the discharge gas is about 5~45 torr.

9. The external electrode fluorescent lamp according to claim 1, further comprising:
metal tubes on the external surface of the ferroelectric glass tube at ends of the ferroelectric glass tube.

10. The external electrode fluorescent lamp according to claim 9, wherein the metal tubes are made of phosphor bronze.

11. A backlight unit of a liquid crystal display device, comprising:
a plurality of external electrode fluorescent lamps that generate light supplied to a liquid crystal display panel;
a diffusion plate that disperses light generated from the external electrode fluorescent lamps; and
optical sheets located between the diffusion plate and the liquid crystal display panel to redirect the dispersed light toward the liquid crystal display panel,
wherein the external electrode fluorescent lamp includes:
a ferroelectric glass tube filled with discharge gas; and
a ferroelectric film on an internal surface of the ferroelectric glass tube; and
external electrodes on an external surface of the ferroelectric glass tube and respectively positioned at ends of the ferroelectric glass tubes,
wherein the external electrode is made from Tin (Sn) of 60~70% by weight, Bismuth (Bi) of 22~28% by weight, Zinc (Zn) 3~6% of by weight, Indium (In) of 1~2% by weight, Antimony (Sb) of 0.2~0.7% by weight and Aluminum (Al) of 0.05~0.15% by weight.

12. The backlight unit according to claim 11, wherein the ferroelectric glass tube has a dielectric constant of about 10~20.

13. The backlight unit according to claim 11, wherein the ferroelectric glass tube is made of one of Li2O, Na2O, K2O and BaO.

14. The backlight unit according to claim 11, wherein the ferroelectric film has a dielectric constant of about 4~20.

15. The backlight unit according to claim 11, wherein the discharge gas in the ferroelectric glass tube has an internal pressure of about 5~45 torr.

16. The backlight unit according to claim 11, further comprising:
metal tubes at ends of the ferroelectric glass tube.

* * * * *